(No Model.)

J. HAYDEN & J. J. ARNOLD.
VESSEL COVER.

No. 267,345. Patented Nov. 14, 1882.

Witnesses:
Oscar L. Owen.
Frank S. Blanchard.

Inventor:
John Hayden and John J. Arnold
By Jno. G. Elliott
Attorney.

UNITED STATES PATENT OFFICE.

JOHN HAYDEN AND JOHN J. ARNOLD, OF CARBONDALE, ILLINOIS.

VESSEL-COVER.

SPECIFICATION forming part of Letters Patent No. 267,345, dated November 14, 1882.

Application filed August 21, 1882. (No model.)

*To all whom it may concern:*

Be it known that we, JOHN HAYDEN and JOHN J. ARNOLD, both citizens of the United States, residing in Carbondale, in the county of Jackson and State of Illinois, have invented certain new and useful Improvements in Vessel-Covers, of which the following is a specification.

Our invention relates to vessel-covers, which covers are provided with a central opening, in which is introduced and suspended an elongated stew-pan containing food to be cooked by the heated contents of the vessel closed by the cover.

The objects of our invention are, first, to provide a vessel-cover which is adjustable to fit vessels of varying sizes; second, to provide a lid supplemental to the vessel-cover for covering its central opening, which lid is adapted to fit the cover in its various adjustments, and is interchangeable with the cover and stew-pan, thereby dispensing with a cover for each of said devices. We attain these objects by devices illustrated in the accompanying drawings, in which—

Figure 1:
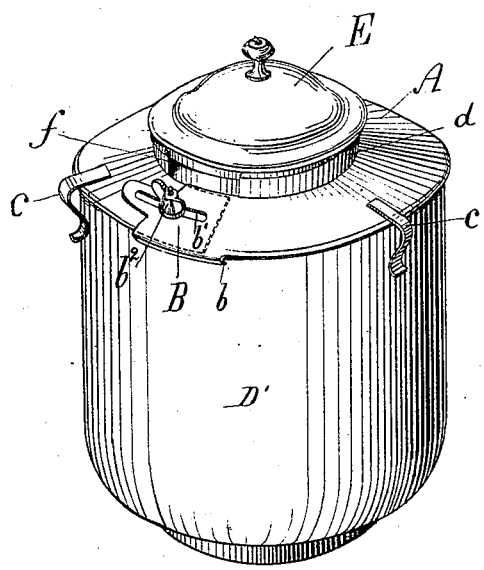
Figure 2:
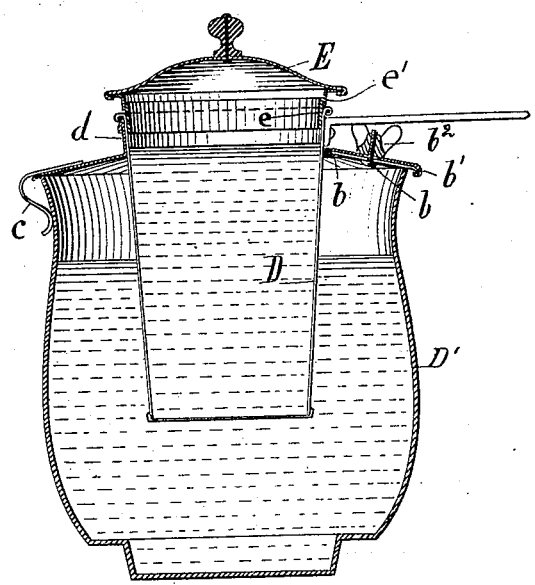
Figure 3:
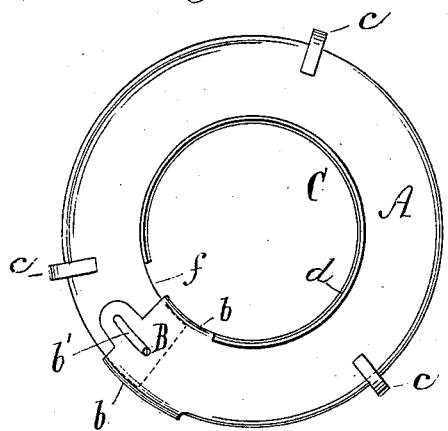
Figure 4:
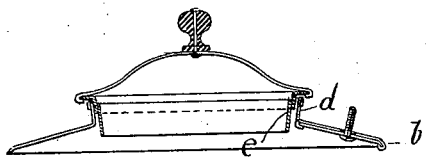

Figure 1 is a perspective view of a vessel provided with a cover embodying our invention; Fig. 2, a vertical section through the center of the same, showing the position of the stew-pan suspended in its operative position in the cover, said stew-pan being closed by a lid, which is also adapted to fit the cover; Fig. 3, a plan view of the cover without the lid or stew-pan, and Fig. 4 a section of the same with the lid fitted therein.

Similar letters of reference indicate the same parts in the several figures of the drawings.

A represents the adjustable annular rim of the cover, the free ends of which overlap each other at B, the upper lap being made a little wider than the lower lap, so as to have its edges turned under to form guides $b\,b$, between which the lower lap is confined and guided when adjusting the cover to fit vessels differing in size, which adjustment is made by contracting or expanding the cover, or, in other words, moving the overlapping ends from or toward each other. The upper lap of the cover is provided with an elongated slot, $b'$, through which projects a screw upset on the under side of the lower lap, and carrying a thumb-nut, $b^2$, which serves to clamp the laps together when the cover is adjusted to the desired size.

In order to preserve the circular outline of the outer, and more especially the inner, edges of the cover, so that said edge will conform to the circular form of and fit closely to the stew-pan or supplemental lid when contracted or expanded, the cover is necessarily given a somewhat flattened conical form, for it will be understood that if the cover inclined to a very considerable extent the effect would be that when the laps are moved to either extremity of their adjustment the inner edge of one would project beyond the other, hence the circular form of the edges of the cover be destroyed.

This cover may be provided with a downwardly-projecting flange on its under side to fit the inside of the vessel; but we preferably employ the spring $c\,c\,c$, attached to the cover and adapted to bind against the outer side of the vessel and hold the cover in position against accidental detachment. The annular form of the cover provides for a central opening, C, the periphery of which opening is surrounded by a flange, $d$, turned up from the cover, which flange serves to stiffen the cover and to form a seat for supporting and suspending the stew-pan D in the vessel D', and also as a seat for the lid E, which lid is supplemental to the cover when the stew-pan is not in use, and is a lid proper for the stew-pan when the stew-pan is suspended in its operative position in the cover.

As before stated, it is desirable to have the lid E fit closely in the stew-pan, and also in the opening in the cover when the stew-pan is out; but it is obvious that as the cover is increased or diminished in size to fit different sizes of vessels the size of the opening is correspondingly increased or diminished. Hence it is necessary that the lid should be adapted to conform to these variations in the cover and also to fit the stew-pan. To this end the flange of the lid E is made conical and of such depth that there may be considerable difference between the upper and lower diameter of the flange, and this difference in diameter is increased by giving the flange the form of a small cone fitting within a larger one, the small one (indicated at $e$) forming the lower portion of the flange or rim, and the larger one, $e'$, forming the upper portion of the flange, and its base secured to and supporting the lid.

If desired, the flange $d$ of the cover A may also be made conformable to the flange of the lid and to the tapering form of the stew-pan.

The turned-over edge $b$ of the cover A necessarily takes off a portion of the rim $d$, and in order to allow the adjustment of the overlapping ends of the cover a portion of the rim of the underlap at $f$ is also omitted; but, as will be understood, there is sufficient rim or flange for the purposes required, and also that the stew-pan or the lid serves to close this opening and preserve the tightness of the joints of the overlapping ends.

By the above construction it will be seen that we have not only provided a vessel-cover adapted to be adjusted to fit varying sizes of vessels, and to support and form a tight joint around a stew-pan projected into the vessel to subject the contents of the stew-pan to the heated contents of the vessel, but have also provided a lid adapted to fit in and conform to the various adjustments of the cover, and at the same time adapted to form a common lid for both the cover and the stew-pan.

Having thus described our invention, what we claim, and desire to secure by Letters Patent, is—

1. A vessel-cover provided with a central opening and adapted to be expanded or contracted to fit vessels of differing sizes, in combination with a supplemental lid fitting in said opening, substantially as described.

2. A vessel-cover provided with a central opening and having overlapping ends sliding upon each other to contract or expand said cover, in combination with a supplemental lid or a stewing-vessel fitting in said opening, substantially as described.

3. The combination, with an expansible vessel-cover having a central opening, and a stewing-vessel fitting in said opening, of a lid interchangeably fitting in said vessel and cover, substantially as described.

4. A vessel-cover having a central opening for the purposes described, and provided with overlapping ends for adapting the cover to varying sizes of vessels, and with spring-clasps to embrace the outer periphery of and clamp the cover to the vessel, substantially as described.

JOHN HAYDEN.
JOHN J. ARNOLD.

Witnesses:
M. C. HAWKINS,
C. R. HAWKINS.